T. A. MILUTIN.
SAFETY DEVICE FOR TRACTORS.
APPLICATION FILED APR. 16, 1920.

1,377,362.

Patented May 10, 1921.
2 SHEETS—SHEET 1.

WITNESS:

INVENTOR
Theodore A. Milutin
BY
ATTORNEY

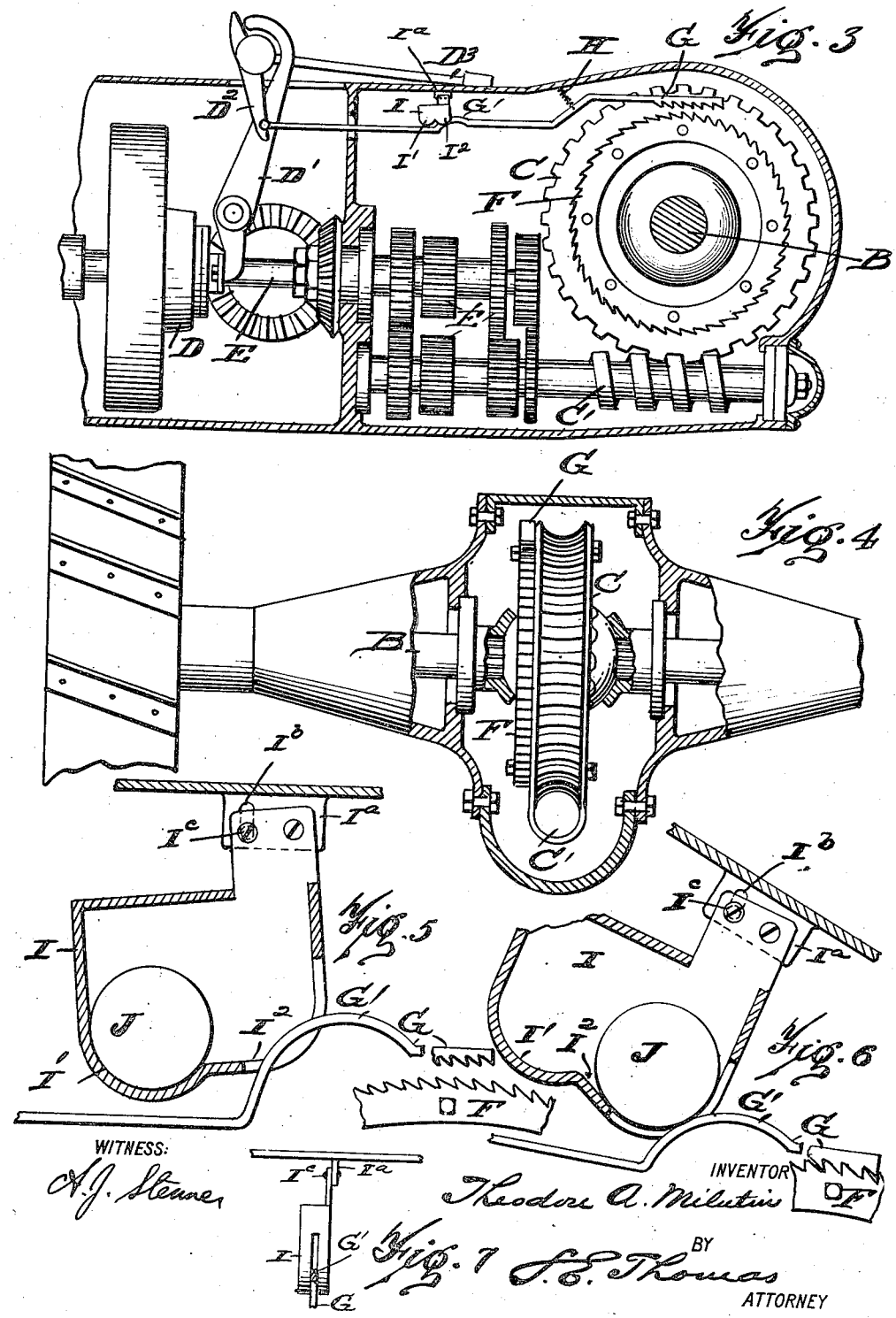

UNITED STATES PATENT OFFICE.

THEODORE A. MILUTIN, OF DEARBORN, MICHIGAN.

SAFETY DEVICE FOR TRACTORS.

1,377,362.   Specification of Letters Patent.   Patented May 10, 1921.

Application filed April 16, 1920. Serial No. 374,308.

*To all whom it may concern:*

Be it known that I, THEODORE A. MILUTIN, citizen of Russia, residing at Dearborn, county of Wayne, State of Michigan, have invented a certain new and useful Improvement in Safety Devices for Tractors, and declare the following to be a full, clear, and exact description of the same, such as will enable others skilled in the art to which it pertains to make and use the same, reference being had to the accompanying drawings, which form a part of this specification.

My invention relates to an automatic safety attachment for tractors, its object being to prevent a tractor from overturning as a result of its sudden stoppage due to meeting an obstruction.

It is well known that many casualties have resulted from tractors overturning due to their sudden stoppage upon encountering an obstruction; for unless the operator instantly releases the driving clutch, or stops the prime mover of the tractor it is apt to tilt upon its rear axle, until attaining a certain degree of angularity it overturns and thus frequently crushes the operator beneath it.

The present invention is designed as a modification or improvement on a somewhat similar device described in an application for patent filed by me on the 6th day of April, 1920, Serial Number 371,658, it being one of the objects of the present invention to provide for a more positive action of the clutch releasing means.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Fig. 3 is a side elevation of a transmission and clutch assembly, with parts in section, showing the device for automatically releasing the clutch mechanism.

Fig. 4 is a fragmentary detail of the rear axle, showing the ring ratchet gear, forming part of this invention, bolted to the worm wheel of the differential gearing.

Fig. 5 is a detail view of the movable weight for automatically controlling the release of the clutch mechanism as it would appear when the clutch is engaged.

Fig. 6 is a similar detail view of the movable weight as it would appear when effecting the release of the clutch mechanism.

Fig. 7 is an end elevation of the chamber in which the weight is lodged.

Referring now to the letters of reference placed upon the drawings:

A, denotes a tractor; B, its rear axle; C, the usual worm-wheel; and C' the worm shaft of the differential gearing.

D, indicates the driving clutch; and D', the clutch lever, D² is a rocking arm for operating the clutch lever, and D³ the clutch pedal for actuating the clutch arm. E, indicates the transmission drive shaft and E', the driving gear. The foregoing elements are of usual and well known construction and require no detailed description here.

F, designates a ring ratchet-gear bolted to the side of the worm-wheel C. G, indicates a bar having ratchet teeth at one end adapted to engage the ratchet teeth of the gear F;—its opposite end entering into a socket formed in the rocking arm D², to receive it. H, is a spring secured to the bar and to the differential housing for normally maintaining the teeth of the ratchet bar out of mesh with the teeth of the ratchet gear F.

Figure 1:
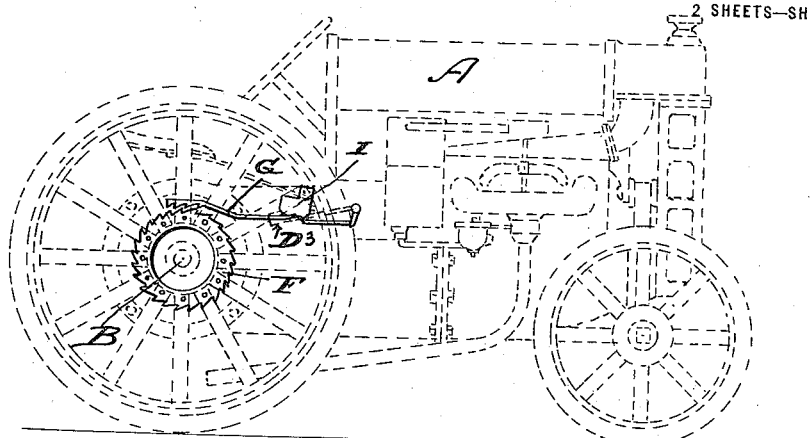
Figure 1 is a side elevation in dotted lines of a tractor showing the invention in full lines installed thereon.
Figure 2:
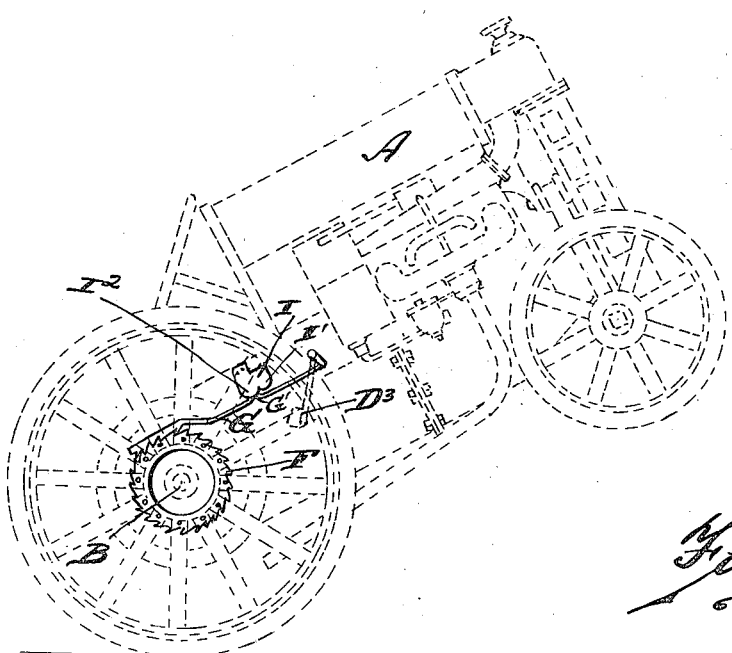
Fig. 2 is a similar view of a tractor tilted upon its rear axle, showing my invention installed in full lines, as it would appear when about to release the clutch mechanism.

I, is a chamber or pocket, adjustably secured to the transmission housing, or other suitable support,—slotted on its lower edge to receive the "hump" portion G', of the ratchet bar G. The lower wall of the chamber I, is formed with two arc-shaped pockets or depressions I', I², in which is alternately lodged a rolling weight J, normally supported in the closed pocket I',—as indicated in Fig. 5,—but when the tractor tilts upwardly upon the rear axle as indicated in Fig. 2, due to a sudden stoppage of the machine through meeting an obstruction;—the weight will roll into the slotted pocket I², thereby depressing the ratchet bar G into engagement with the ratchet gear F;—the rotation of which drives the ratchet bar forward, thereby operating the clutch levers and thus releasing the driving clutch. Upon the clutch being released the operator changes the gear shift lever to "neutral" whereupon the tractor will return to the ground by gravity.

To provide for the adjustment of the weight pocket I, the supporting bracket $I^a$, is slotted as shown at $I^b$, so that by the adjustment of the bolt $I^c$, any desired degree of angularity may be given to the pocket.

It will now be seen that should the tractor or implement drawn thereby encounter a root, stone or other obstruction, causing the tractor to come to a sudden stop,—the differential gearing still operating, would cause the tractor to tilt upwardly upon the rear axle until reaching a certain degree of angularity the rolling weight would automatically shift into the pocket $I^2$, thereby depressing the ratchet-bar into engagement with the rotating ratchet-gear thus releasing the clutch mechanism that the tractor may return to the ground as previously explained upon the operator shifting the gear shift lever to "neutral."

Having thus described my invention, what I claim is:—

1. In a tractor, the combination of a driving clutch mechanism; means for releasing the clutch mechanism adapted to extend into the path of a rolling weight, and the rolling weight, adapted upon the tractor tilting to a certain degree of angularity to shift from its normal neutral position, to one whereby it is adapted to act upon the clutch releasing means, whereby the tractor may return to its normal position.

2. In a tractor, the combination of a driving clutch mechanism, means for releasing the clutch mechanism, a chamber having two pockets adapted to alternately receive a rolling weight, means extending through said chamber adapted to release the clutch mechanism, and a rolling weight lodged in said chamber adapted to automatically shift therein from a neutral position to a position adapted to act upon the clutch releasing means, whereby the clutch is released, upon the tractor attaining a certain degree of angularity.

3. In a tractor, the combination of a drive shaft, a driving clutch, a clutch controlling means, a ratchet gear adapted to be operated by the differential gearing of the rear axle, an adjustable chamber having two connecting pockets adapted to alternately receive a movable weight, a ratchet bar extending through a slot in the wall of said chamber and connected at one end with the clutch controlling means, means for maintaining said ratchet bar normally out of engagement with the ratchet gear, and a rolling weight lodged in said chamber adapted upon the tractor tilting to a certain degree of angularity to automatically shift its position in said chamber from one pocket to the other whereby it may bear upon said ratchet bar to force it into engagement with the ratchet gear to release the driving clutch.

4. In a tractor, the combination of a drive shaft, a driving clutch, a clutch releasing means, an adjustable chamber having connecting pockets adapted to support a weight, a rolling weight lodged in said pockets adapted to automatically release said clutch releasing means upon said weight shifting its position in said chamber from one pocket to the other due to the tilting action of the tractor when in operation.

In testimony whereof, I sign this specification in the presence of two witnesses.

THEODORE A. MILUTIN.

Witnesses:
S. E. THOMAS,
JOHN CONSIDINE, Jr.